United States Patent
Patience et al.

(10) Patent No.: US 9,243,190 B2
(45) Date of Patent: Jan. 26, 2016

(54) METHOD AND APPARATUS FOR PRODUCING CHEMICALS FROM A METHANE-CONTAINING GAS

(71) Applicant: ME RESOURCE CORP., Vancouver (CA)

(72) Inventors: Gregory Patience, Town of Mount Royal (CA); Daria Camilla Boffito, Montreal (CA)

(73) Assignee: ME RESOURCE CORP, Vancouver (CA)

(*) Notice: Subject to any disclaimer, the term of this patent is extended or adjusted under 35 U.S.C. 154(b) by 0 days.

(21) Appl. No.: 14/532,436

(22) Filed: Nov. 4, 2014

(65) Prior Publication Data
US 2015/0126628 A1    May 7, 2015

Related U.S. Application Data

(60) Provisional application No. 61/899,523, filed on Nov. 4, 2013.

(51) Int. Cl.
| | |
|---|---|
| C10G 2/00 | (2006.01) |
| C01B 3/38 | (2006.01) |
| B01J 8/24 | (2006.01) |
| B01J 8/34 | (2006.01) |
| B01J 19/00 | (2006.01) |
| B01J 8/08 | (2006.01) |
| B01J 8/02 | (2006.01) |

(52) U.S. Cl.
CPC . *C10G 2/344* (2013.01); *B01J 8/02* (2013.01); *B01J 8/08* (2013.01); *B01J 8/34* (2013.01); *B01J 19/00* (2013.01); *C01B 3/38* (2013.01); *C01B 3/386* (2013.01); *C10G 2/332* (2013.01); *C10G 2/333* (2013.01); *C10G 2/334* (2013.01); *C01B 2203/0261* (2013.01); *C01B 2203/062* (2013.01); *C01B 2203/0811* (2013.01); *C01B 2203/1241* (2013.01); *C01B 2203/1604* (2013.01); *C01B 2203/169* (2013.01); *C10G 2300/4031* (2013.01)

(58) Field of Classification Search
CPC ... C10G 2/341; C10G 2/344; C01B 2203/062
See application file for complete search history.

(56) References Cited

U.S. PATENT DOCUMENTS

| | | | | |
|---|---|---|---|---|
| 5,080,872 A | * | 1/1992 | Jezl | B01J 8/0285 422/148 |
| 6,593,377 B1 | * | 7/2003 | Harford | C10G 2/331 518/702 |

OTHER PUBLICATIONS

Enger, Bjorn Christian, Lodeng, Rune, Holmen, Anders, "A review of catalytic partial oxidation of methane to synthesis gas with emphasis on reaction mechanisms over transition metal catalysts", Applied Catalysis A: General 346 (2008) 1-27.

* cited by examiner

*Primary Examiner* — Lessanework Seifu
(74) *Attorney, Agent, or Firm* — Goudreau Gage Dubuc; Isabelle Pelletier

(57) ABSTRACT

An apparatus and a method for producing chemicals from a methane-containing gas are provided. More specifically, the method and an apparatus make use of heterogeneous catalysis, beginning with the partial oxidation of methane to produce synthesis gas followed by a reaction, such as a Fischer-Tropsch reaction, to produce the chemicals.

20 Claims, 1 Drawing Sheet

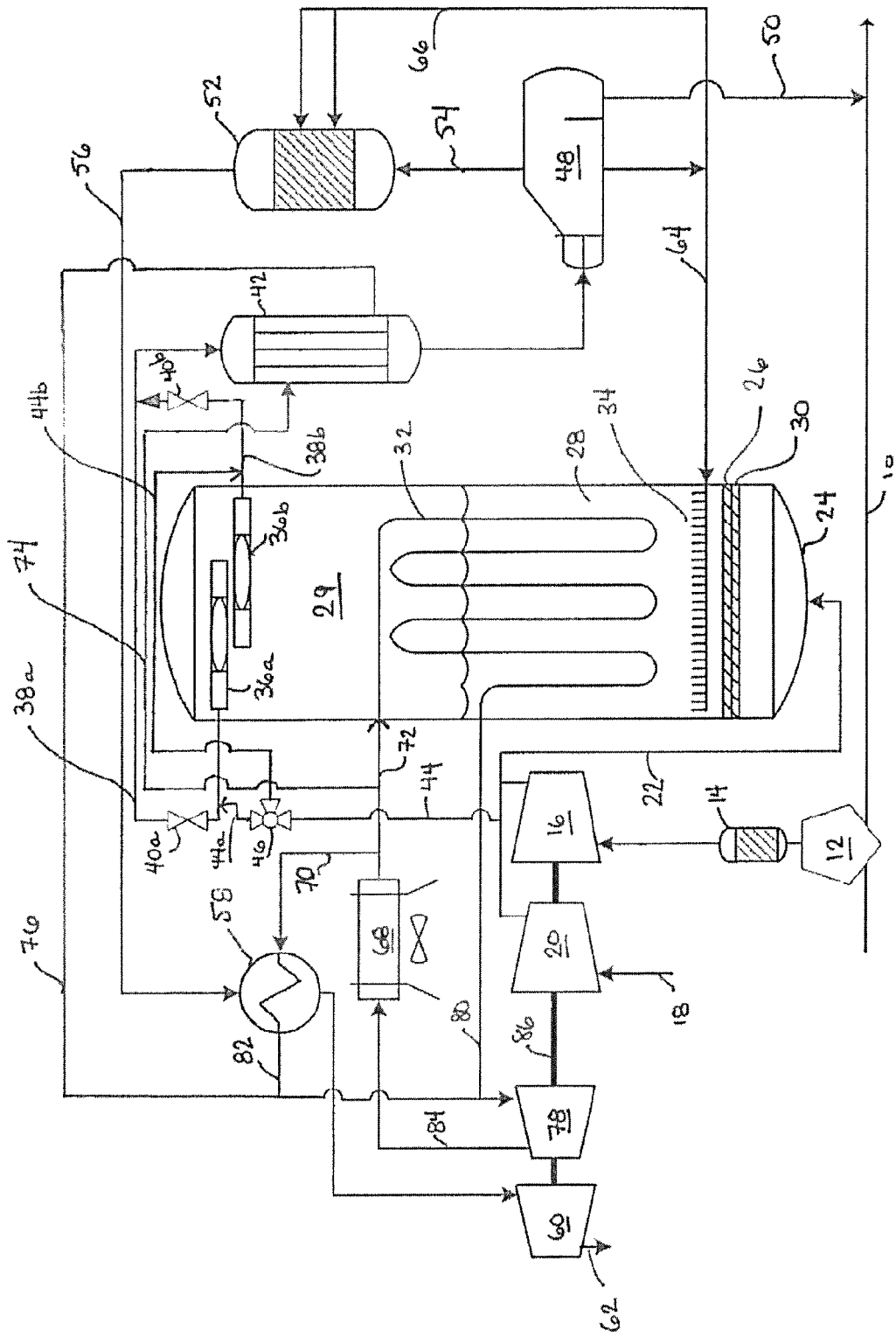

METHOD AND APPARATUS FOR PRODUCING CHEMICALS FROM A METHANE-CONTAINING GAS

CROSS REFERENCE TO RELATED APPLICATIONS

This application claims benefit, under 35 U.S.C. §119(e), of U.S. provisional application Ser. No. 61/899,523, filed on Nov. 4, 2013

FIELD OF THE INVENTION

The present invention relates to a method and an apparatus for producing chemicals and/or heat/energy and/or water from a methane-containing gas. More specifically, the present invention is concerned with a method and an apparatus, which make use of heterogeneous catalysts, beginning with the partial oxidation of methane to produce synthesis gas followed by a second catalytic reaction, for example a Fischer-Tropsch reaction, to produce chemicals and/or heat/energy and/or water.

BACKGROUND

Wasted or stranded natural gas is often vented, flared or shut in due to poor economic conditions. Some natural gas is extracted together with conventional oil—also known as associated gas. Often this gas is in remote locations and it is uneconomical to build a pipeline to collect the gas or collect the gas (and/or waste) via truck. Therefore, this gas may be flared (flared gas) and under circumstances where environment regulations are strict, the production wells are shut in. Transforming the natural gas into useful products—methanol, diesel, gasoline, solvents, or any other hydrocarbon—is an attractive opportunity to reduce $CO_2$ emissions due to flaring and producing an economically viable end-product.

As an example of an end-product, diesel is a petroleum-based fuel derived from conventional reserves, heavy oil bitumen as well as from natural gas at a very large scale. Producing diesel at small scale has been economically unattractive due to the large investment costs required. Commercial units are on the order of 100 000 barrels a day production and smaller units in the range of 5-10 000 barrels a day have been proposed. Reducing the investment and operating costs is critical to commercializing a process at production rates of less than 1000 barrels a day.

Converting natural gas to diesel or other end-products conventionally involves a multi-step process.

In a first step, the oil and gas are separated as they come out of the well and the natural gas is treated to remove impurities including sulphur compounds ($H_2S$, COS, etc.).

In a second step, natural gas and an oxidant are compressed and then the natural gas is converted into synthesis gas (also called syngas, which is mostly a mixture of CO and $H_2$). Many technologies have been proposed for this step.

Most common technologies are based on steam methane reforming (SMR) in which water vapour is fed together with methane over a Ni based catalyst. To use this technology, both sulphur impurities and higher hydrocarbons must be removed as they can poison the catalyst and cause carbon build up. Furthermore, the reaction is highly endothermic such that as much as 20% of the natural gas is required in order to maintain the reactor at about 900° C. The SMR reaction results in a $H_2$:CO ratio of 3 to 4:1, that is an excess of hydrogen as will be discussed below.

Besides SMR, both Auto Thermal Reforming (ATR) and partial oxidation (POX) are used to produce synthesis gas. ATR uses oxygen and carbon dioxide or steam in a reaction with methane to form syngas. In this reaction, the methane is partially oxidized. The reaction is exothermic due to the oxidation. When the ATR uses carbon dioxide the $H_2$:CO ratio produced is 1:1; when the ATR uses steam the $H_2$:CO ratio produced is 2.5:1, which again is an excess of hydrogen. The main difference between SMR and ATR is that SMR uses no oxygen. The advantage of ATR is that the $H_2$:CO can be varied. POX is a process in which natural gas or a heavy hydrocarbon fuel (heating oil) is mixed with a limited amount of oxygen in an exothermic process. The general reaction equation is:

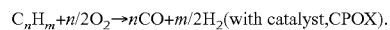
$$C_nH_m + n/2 O_2 \rightarrow nCO + m/2 H_2 \text{(with catalyst, CPOX)}.$$

The last step of one type of end-product is the actual production of diesel through a Fischer-Tropsch (FT) reaction. The Fischer-Tropsch process, converting synthesis gas to diesel, is conducted at low temperature—approximately 220° C. with a cobalt based catalyst or at a slightly higher temperature (300° C.) with an iron based catalyst. The reaction stoichiometry is:

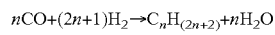
$$nCO + (2n+1)H_2 \rightarrow C_nH_{(2n+2)} + nH_2O$$

where n varies from 2 to 40. The produced gases condense resulting two liquid phases. The bottom aqueous phase is predominantly water and the less dense top-organic phase is comprised of $C_{4+}$ hydrocarbons.

This reaction optimally requires a ratio of 2.1-2.3:1 ($H_2$:CO). Hydrogen beyond this ratio will react with CO in the diesel step (FT) to form methane. Therefore, prior to the FT step, excess hydrogen must be removed either through membrane technology, pressure swing absorption or through the Water Gas Shift Reaction.

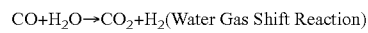
$$CO + H_2O \rightarrow CO_2 + H_2 \text{(Water Gas Shift Reaction)}$$

Current technologies for producing diesel from natural gas are capital intensive, require multiple steps, and reagents to achieve yields no better than 50%. Together with the extra vessels, piping, valves, flow meters, fittings, are also required. Furthermore, during start-up, provision must be made to heat the reactors up from ambient conditions to reaction conditions. This is accomplished with start-up burners (typically methane). The start-burner also requires investment including additional piping, valves, flowmeters and associated safety equipment and control measures.

SUMMARY OF THE INVENTION

In accordance with the present invention, there is provided:
1. An apparatus for producing chemicals from a methane-containing gas, the apparatus comprising:
   a reactor comprising:
      a gas input,
      a reaction product output, the gas input and the reaction product output defining together a gas flow path in the reactor,
      a partial oxidation reaction zone located inside the reactor downstream of the gas input, the partial oxidation reaction zone comprising a supported or unsupported partial oxidation metal catalyst, and
      a Fischer-Tropsch reaction zone located inside the reactor downstream of the partial oxidation reaction zone, the Fischer-Tropsch reaction zone comprising a Fischer-Tropsch catalyst, a methane-containing gas source feeding the methane-containing gas at a given partial pressure to the gas input, and an air source feeding air at a given partial pressure to the gas input, wherein, upon starting operation, the partial oxidation reaction zone is heated to start a partial oxidation reaction, and wherein, during operation, the temperature in the partial oxidation reaction zone is controlled by variation of the partial pressure of the methane-containing gas fed to the input.

2. The apparatus of item, wherein the gas input is located at the bottom of the reactor, the partial oxidation reaction zone is located above the gas input, the Fischer-Tropsch reaction zone is located above the partial oxidation reaction zone, and the reaction product output is located at the top of the reactor.

3. The apparatus of item 1 or 2, wherein the partial oxidation reaction zone comprises a fluidized bed of the partial oxidation metal catalyst.

4. The apparatus of item 1 or 2, wherein the partial oxidation reaction zone comprises a fixed bed of the partial oxidation metal catalyst.

5. The apparatus of item 1 or 2, wherein the partial oxidation reaction zone comprises a gauze reactor containing the partial oxidation metal catalyst.

6. The apparatus of any one of items 1 to 5, wherein the Fischer-Tropsch reaction zone comprises a fluidized bed of the Fischer-Tropsch catalyst.

7. The apparatus of any one of items 1 to 5, wherein the Fischer-Tropsch reaction zone comprises a fixed bed of the Fischer-Tropsch catalyst.

8. The apparatus of any one of items 1 to 7, wherein, upon starting operation, the partial oxidation reaction zone is heated by burning methane in the partial oxidation reaction zone.

9. The apparatus of any one of items 1 to 7, wherein, upon starting operation, the partial oxidation reaction zone is heated by a heater located downstream of the gas input and upstream of the partial oxidation reaction zone.

10. The apparatus of item 9, wherein the heater is an induction heater, an electrical heater, or a methane burner.

11. The apparatus of any one of items 1 to 10, further comprising a cooling device to maintain the Fischer-Tropsch reaction zone at a temperature appropriate for reaction with the Fischer-Tropsch catalyst.

12. The apparatus of item 11, wherein the cooling device is cooling coils located in the Fischer-Tropsch reaction zone.

13. The apparatus of item 11 or 12, wherein the cooling device is a water sparger located downstream of the partial oxidation reaction zone and upstream of the Fischer-Tropsch reaction zone.

14. The apparatus of any one of items 1 to 13, wherein the temperature of the Fischer-Tropsch reaction zone is between about 180 to about 450° C.

15. The apparatus of any one of items 1 to 14, further comprising a filter, connected to the reaction product output of the reactor, to prevent escape of the partial oxidation metal catalyst and/or the Fischer-Tropsch catalyst from the reactor.

16. The apparatus of item 15, wherein the air source feeds a blow back line to clean the filter.

17. The apparatus of any one of items 1 to 16, further comprising a condenser connected to the reaction product output of the reactor and comprising a condensed reaction product output.

18. The apparatus of item 17, further comprising a separator, or two or more successive separators, connected to the condensed reaction product output of the condenser and comprising a gas output, a liquid water output, and a liquid reaction products output.

19. The apparatus of item 18, further comprising a post-treatment reactor connected to the gas output of the separator and comprising a post-treated gas output.

20. The apparatus of item 19, wherein the liquid water output of the separator feeds water to the water sparger in the reactor and/or to water sparger in the post-treatment reactor.

21. The apparatus of item 19 or 20, further comprising a waste heat boiler connected to the post-treated gas output of the post-treatment reactor, the waste heat boiler comprising a cooled gas output.

22. The apparatus of item 21, further comprising an expander connected to the cooled gas output of the waste heat boiler.

23. The apparatus of any one of items 1 to 22, further comprising a water cooler feeding boiler feedwater to the cooling coils, the waste heat boiler, and/or the condenser.

24. The apparatus of any one of items 1 to 23, further comprising a turbine fed by water vapor produced by the cooling coils, the waste heat boiler, and/or the condenser.

25. The apparatus of item 24, wherein the turbine feeds water vapor to the water cooler.

26. The apparatus of any one of items 1 to 25, wherein the methane-containing gas and/or the air is provided by a compressor.

27. The apparatus of item 26, wherein the turbine and/or the expander power the compressor.

28. The apparatus of any one of items 1 to 27, wherein the partial oxidation metal catalyst is an unsupported or supported transition metal of the groups IIIB to VIIIB.

29. The apparatus of item 28, wherein the Fischer-Tropsch catalyst is unsupported or supported Fe, Co, Ni, Pd, Pt, Rh, and Ru, in metal form or in oxide form.

30. A method for producing chemicals from a methane-containing gas, the method comprising the steps of:
  (a) introducing a mixture of the methane-containing gas and air in a reactor comprising a partial oxidation reaction zone and a Fischer-Tropsch reaction zone,
  (b) allowing the mixture to pass through a partial oxidation reaction zone at a temperature of about 800 to 1200° C., the partial oxidation reaction zone comprising a supported or unsupported partial oxidation metal catalyst, thereby producing synthesis gas,
  (c) allowing the synthesis gas to pass through a Fischer-Tropsch reaction zone comprising a Fischer-Tropsch catalyst maintained at an appropriate temperature for Fischer-Tropsch reaction, thereby producing the chemicals, and
  (d) collecting the chemicals from a reaction product output of the reactor.

31. The method of item 30, further comprising, before step (b), heating the partial oxidation reaction zone by burning methane in the partial oxidation reaction zone.

32. The method of item 30 or 31, further comprising, during step (b) maintaining the temperature in the partial oxidation reaction zone at about 800 to 1200° C. by varying a partial pressure of the methane-containing gas introduced in the reactor.

33. The method of any one of items 30 to 32, further comprising condensing the chemicals.

34. The method of item 33, further comprising separating the condensed chemicals from water and remaining gaseous compounds.

35. The method of item 34, further comprising post-treating the remaining gaseous compounds.
36. The method of any one of items 30 to 35, wherein the partial oxidation metal catalyst is an unsupported or supported transition metal of the groups IIIB to VIIIB.
37. The method of any one of items 30 to 36, wherein the Fischer-Tropsch reaction zone is maintained at a temperature of about 180 to about 450° C.
38. The method of any one of items 30 to 37, wherein the Fischer-Tropsch catalyst is unsupported or supported Fe, Co, Ni, Pd, Pt, Rh, and Ru, in metal form, in oxide form, or in carbide form.

BRIEF DESCRIPTION OF THE DRAWINGS

In the appended drawings, FIG. 1 is a scheme of a system according to an embodiment of the invention.

DETAILED DESCRIPTION OF THE INVENTION

Turning now to the invention in more details, there is provided a method and an apparatus for producing chemicals from a methane-containing gas. More specifically, the present invention is concerned with a method and an apparatus, which make use of heterogeneous catalysis, beginning with the partial oxidation of a methane-containing gas to produce synthesis gas followed by a second catalytic reaction, for example a Fischer-Tropsch reaction, to produce these chemicals.

The produced chemicals are Fischer-Tropsch reaction products. Herein, "Fischer-Tropsch reaction products" means all compounds that are known to be produced by the Fischer-Tropsch reaction. Non-limiting examples of Fischer-Tropsch reaction products include fuels, gasoline, diesel, methanol, dimethylether (DME), $C_{3-100}$ linear or branched alkanes including liquid propane gas, olefins such as $C_{3-100}$ linear or branched alkenes, $C_{3-100}$ linear or branched alkynes, and $C_{1-100}$ linear or branched alcohols as well as mixtures thereof. Preferred reaction products include $C_{3-6}$ alkanes, $C_{2-20}$ alkenes (such as ethylene and propylene), $C_{5-24}$ diesel, methanol, and DME.

As will be described below, the method and apparatus also produce water and heat (that can be used to produce energy). These are valuable resources in many locations where methane-containing gas is extracted. Therefore, in some of its aspects the invention also provide a method and an apparatus for producing water and/or heat and/or energy; these method and apparatus being as described herein with regards to the production of chemicals.

Herein, the methane-containing gas can be any gas containing methane. For example, gases comprising methane and further comprising ethane, propane, and/or butane would be appropriate. Ideally, the methane-containing gas should be free of gases that could poison the catalyst used in the method and with the apparatus. Such poisoning gases include non-organic sulfur containing compounds (e.g. $H_2S$). When such poisoning gases are present, methane-containing gas should be cleaned from them using, for example, a gas-cleaning unit as described below. Non-limiting examples of methane-containing gas include methane, natural gas (including stranded, wasted and associated natural gas), flared gas, landfill gas, biogas, etc. Such gases are often simply vented, flared or shut in due to poor economic conditions.

Apparatus

There is therefore provided an apparatus for producing chemicals, for example Fischer-Tropsch reaction products, from a methane-containing gas.

This apparatus comprises:
a reactor comprising:
a gas input,
a reaction product output, the gas input and the reaction product output defining together a gas flow path in the reactor,
a partial oxidation reaction zone located inside the reactor downstream of the gas input, the partial oxidation reaction zone comprising a supported or unsupported partial oxidation metal catalyst, and
a Fischer-Tropsch reaction zone located inside the reactor downstream of the partial oxidation reaction zone, the Fischer-Tropsch reaction zone comprising a Fischer-Tropsch catalyst,
a methane-containing gas source feeding the methane-containing gas at a given partial pressure to the gas input, and
an air source feeding air at a given partial pressure to the gas input.

The reactor can be any reactor known in the art; including fluidized bed reactors Non-limiting example includes circulating fluidized beds, cyclonic fluidized beds, rotating fluidized beds, downflow fluidized beds, etc.

The reactor has a gas input fed by a methane-containing gas source and an air source as well as a reaction product output. Therefore, the gas input and the reaction product output defining together a gas flow path in the reactor. In embodiments, the gas input is located at the bottom of the reactor while the reaction product output is located higher up in the reactor, above the partial oxidation reaction zone and the Fischer-Tropsch reaction zone.

The sources of methane-containing gas and air both feed the gas input. In the mixture fed to this gas input therefore, the methane-containing gas has a given partial pressure and so does the air. In embodiments, the methane-containing gas and/or the air are provided by compressors. Such compressors allow varying the respective pressures (and thus the partial pressures at the gas input) of the methane-containing gas and air.

Going downstream along the gas flow path defined by the input and output, the mixture of gases will first encounter the partial oxidation reaction zone, which comprises a supported or unsupported partial oxidation metal catalyst. In embodiments, the partial oxidation reaction zone comprises a fluidized bed of the partial oxidation metal catalyst, a fixed bed of the partial oxidation metal catalyst, or a gauze reactor containing the partial oxidation metal catalyst. The gauze reactor is basically a gauze comprising the partial oxidation metal catalyst.

The partial oxidation metal catalyst is a metal that catalyse partial oxidation of methane (with oxygen) to produce synthesis gas. This metal can be any metal known to catalyse this reaction. Non-limiting examples of catalysts include transition metal of the groups IIIB to VIIIB, preferably metals of the groups VIIIB, such as Ni, Pd, Pt, as well as other noble metal catalysts. The catalyst may also contain other noble metals as a promoters; non-limiting examples of which includes metal of groups IA to VIIIB, preferably metals of groups VIIIB, such as Ru, Rh, Pd, and Pt. The metal catalyst can be unsupported or supported. Non-limiting examples of supports include $Al_2O_3$, $SiO_2$, $Y_2O_3$, $WO_3$, $ZrO_2$, $TiO_2$, MgO, CaO, Fecralloy® (in all its forms), preferably $Al_2O_3$ and $SiO_2$. In embodiments, the gauze is a disk gauze. In embodiments, the gauze is removable, and thus easily replaceable (for example through a porthole), which reduces downtime when the metal catalyst of the gauze reactor deactivates.

For partial oxidation to take place, the mixture of the gases must be at a temperature above about 600° C., for example from about 800 to about 1200° C., preferably from about 900 to about 1100° C., more preferably from about 950 to about 1100 when it meets the partial oxidation metal catalyst. Upon starting operation, the partial oxidation reaction zone, the partial oxidation metal catalyst and gases are typically colder than that. Therefore, upon starting operation, the partial oxidation reaction zone is heated to a temperature of about 800 to about 1200° C. to start the partial oxidation reaction.

This can be achieved in many ways. First, a heater, in fact any apparatus that can generate heat, can be used. Examples of heaters include induction heaters, electrical heaters, and methane burners. Another method of heating the partial oxidation reaction zone is to use the partial oxidation reaction zone to burn methane. This is achieved by passing an oxygen (air) rich mixture of air and methane-containing gas in the partial oxidation reaction zone.

Partial oxidation is exothermic. Therefore, the need for heating will be reduced (or even eliminated) once partial oxidation is ongoing. In fact, during operation, the temperature in the partial oxidation reaction zone is controlled by variation of the partial pressures of the methane-containing gas and air fed to the input. Generally, the temperature can be decreased by increasing air partial pressure, while the temperature will rise when increasing the partial pressure of the methane-containing gas.

Still travelling downstream in the reactor, the mixture of gases, now comprising synthesis gas produced by the partial oxidation reaction, will meet and pass through the Fischer-Tropsch reaction zone. In embodiments, the Fischer-Tropsch reaction zone comprises a fluidized bed of the Fischer-Tropsch catalyst or a fixed bed of the Fischer-Tropsch catalyst.

The Fischer-Tropsch catalyst can be any catalyst known to catalyse the Fischer-Tropsch reaction. Non-limiting examples of such catalysts include those based on Fe, Co, Ni, Pd, Pt, Rh, and Ru, preferably those based on Fe and Co. These may be unsupported or supported over e.g. alumina, silica, titania, zirconia, yttria, tungsten trioxide silica-alluminates, zeolites, carbon, clays, or FCC catalyst. In embodiments, the loading of the metal (Fe, Co, etc.) on the support may vary from 1 to 50%, preferably from 10 to 40% by weight for Fe and from 5 to 30% by weight for Co considering the total weight of the catalyst. This catalyst may also contain other metal promoters, such as metals for groups IA, IIA, IB, and VIIIB, preferably for Co, Rh, Ru for iron-based catalysts and K for copper-based catalysts. In the embodiment the loading of each promoter may vary from 0.1% to 10%, preferably from 0.2% to 5% on a Fe-based catalyst and from 0.1% to 1% for the promoters of Co catalysts. In embodiments, the catalyst for Fischer Tropsch is loaded in the reactor in metal form, in oxide form, or in carbide form. Non-limiting examples of oxides, supported or unsupported (see above), include $Fe_3O_4$ and $Co_3O_4$. The catalyst in oxide form are reduced to the metallic form in situ by a reducing environment (for example $H_2$, CO, $H_2/CO$, (synthesis gas), etc.). The reducing gas or gases may be used pure or diluted in an inert gas (for example $N_2$, Ar, He or their mixtures, etc.). In embodiments, reduction of the metal oxide to the metal form may require from 2 hours to 48 hours, depending on the nature of the catalyst.

The Fischer Tropsch catalyst should resist mechanical stress and be compatible with catalyst regeneration. Such regeneration may be necessary as coking can take place during the reaction. Catalyst regeneration can be carried with air or any other oxidizing environment (for example $O_2/N_2$, $N_2O$, $NO_2$, $CO_2$, etc.). The frequency of catalyst regeneration will depend on the nature of catalyst and degree of coking. As a rule of thumb, the catalyst should be replaced when its activity drops below 40%. Therefore, in embodiments, the reactor is provided with a porthole allowing replacement of the catalyst.

The Fischer-Tropsch catalyst should be kept at a temperature appropriate for the Fischer-Tropsch reaction to occur. Therefore, in embodiments, the temperature of the Fischer-Tropsch reaction zone is controlled using a cooling device so as to ovoid overheating. The apparatus may thus comprise cooling coils in the Fischer-Tropsch reaction zone to maintain it at the desired temperature. In embodiments, the apparatus of the invention may comprise a water sparger, located downstream of the partial oxidation reaction zone and upstream of the Fischer-Tropsch reaction zone, to aid in maintaining it at requested temperature.

For example, Fischer-Tropsch reaction typically occurs at a temperature between about 180 and about 300° C., preferably between about 200 and about 250° C., and most preferably between about 200 and about 240° C. when using cobalt-based catalysts, and at a temperature between about 200 and about 450° C., preferably between about 250 and about 400° C., and more preferably between about 285 and about 350° C. when using iron-based catalysts.

The gases exit the reactor through the abovementioned reaction product output. These gases include the desired chemicals [for example the Fischer-Tropsch reaction products (vapor), perhaps also including ethane and propane], water (vapor), nitrogen, hydrogen, unreacted methane, as well as by-products such as CO and $CO_2$.

In specific embodiments, the above apparatus comprises:
a fluidized bed reactor,
a methane-containing gas source feeding the methane-containing gas at a given partial pressure to a gas input located at the bottom of the fluidized bed reactor,
an air source feeding air at a given partial pressure to the gas input,
an induction heater located above the gas input,
a gauze reactor located above the induction heater, the gauze reactor comprising a gauze that comprises a supported or unsupported partial oxidation metal catalyst,
a fluidized bed of a catalyst, for example a Fischer-Tropsch catalyst, located above gauze reactor,
optionally cooling coils located in the fluidized bed, and
a reaction product output located above the fluidized bed.

In embodiments, the apparatus further comprise a filter, connected to the reaction product output of the reactor. The purpose of this filter is to prevent escape of the catalysts from the reactor. The gas velocity in the reactor should be kept sufficiently low to minimize entrainment of the catalysts to the filters. Typically, the gas velocity would be less than 3 m per second, for example less than 1 m per second.

Should the filters become plugged, the apparatus is provided, in embodiments, with a blow back line to clean it. The filters should be replaced if the pressure drop becomes too large and the blow back becomes ineffective. Thus, the reactor can be provided with a porthole allowing replacement of the filters.

In embodiments, there is more than one reaction product outputs, for examples two, each optionally associated with a filter.

In embodiments, a condenser is connected to the reaction product output of the reactor. The purpose of this condenser is to condense the produced chemicals (that are condensable) and the water vapor to produce liquid reaction products and liquid water, respectively. This condenser discharges the liquid reaction products, liquid water and the remaining gases through a condensed reaction product output.

In further embodiments, the apparatus further comprises one separator, or two or more successive separators, connected to the condensed reaction product output of the condenser. These separators can be two- or three-phases separators. The separators specific design can be tailored to the gases being separated to remove different reaction products and by-products.

The purpose of this separator is to separate the gases from the liquids and to separate the liquid water from the (generally lighter) liquid reaction products. The three separate phases thus obtained are discharged through a gas output (discharging the (hot and pressurized) gases), a liquid water output, and a liquid reaction products output.

At this point, the reaction products (the produced chemicals in liquid form) can be stored, used, or sent to a pipeline, for example, the same pipeline that provided the methane-containing gas.

In embodiments, the liquid water output of the separator feeds water to the water sparger in the reactor and/or to a water sparger in a post-treatment reactor (discussed below).

In further embodiments, the apparatus further comprises a post-treatment reactor connected to the gas output of the separator and comprising a post-treated gas output. This post-treatment reactor may be a turbine that combust CO, hydrogen, residual methane, other light hydrocarbon (e.g. ethane, propane), and any other flammable gas present to produce energy. This post-treatment reactor may also be a catalytic reactor for reaction with CO, residual methane, and other gases present to produce $N_2$, $H_2O$, and $CO_2$. In either embodiment, the gases going out the post-treated gas output will be $N_2$, $H_2O$, and $CO_2$ (hot and pressurized).

In further embodiments, the apparatus further comprises a waste heat boiler connected to the post-treated gas output of the post-treatment reactor. This waste heat boiler will use the heat of the post-treated gases to vaporize water. The waste heat boiler comprises a cooled gas output to discharge the cooled, but still pressurized gases.

In embodiments, the apparatus further comprises an expander connected to the cooled gas output of the waste heat boiler. The cooled pressurized gases will drive this expander to produce energy, before being discharged.

In embodiments, the apparatus further comprises a water cooler for feeding boiler feedwater to the cooling coils, the waste heat boiler, and/or the condenser (for cooling).

In embodiments, the apparatus further comprises a turbine fed by water vapor produced by the cooling coils, the waste heat boiler, and/or the condenser. In embodiments, water vapor discharged from the turbine is fed to the water cooler.

In embodiments, the turbine and/or the expander power the compressors.

Method

There is also provided a method for producing chemicals from a methane-containing gas. This method comprises the steps of:
(a) introducing a mixture of the methane-containing gas and air in a reactor,
(b) allowing the mixture to pass through a partial oxidation reaction zone at a temperature of about 900 to 1000° C., the partial oxidation reaction zone comprising a supported or unsupported partial oxidation metal catalyst, thereby producing synthesis gas,
(c) allowing the synthesis gas to pass through a Fischer-Tropsch reaction zone comprising a Fischer-Tropsch catalyst maintained at an appropriate reaction temperature for Fischer-Tropsch reaction, for example about 200 to about 400° C., thereby producing the chemicals, and
(d) collecting the chemicals from a reaction product output of the reactor.

In this method, the reactor, partial oxidation reaction zone, partial oxidation metal catalyst, Fischer-Tropsch reaction zone and Fischer-Tropsch catalyst are as described above.

It should be noted all of steps (a) to (d) occur in a single vessel: the abovementioned reactor.

In embodiments, the method further comprises, before step (b), heating the partial oxidation reaction zone at a temperature of about 800 to 1200° C., for example about 900 to 1000° C. A described above, this can be achieved, for example, by heating the mixture with a heater located in the reactor downstream of the partial oxidation reaction zone or by burning methane in the partial oxidation reaction zone. As discussed above, the partial oxidation is exothermic. Therefore, the need for this heating is reduced (or even eliminated) once the reaction is ongoing.

In embodiments, the method further comprises, during step (b), maintaining the temperature in the partial oxidation reaction zone at about 900 to 1000° C. by varying (as explained above) a partial pressure of the methane-containing gas introduced in the reactor.

The reaction products include the desired chemicals (as vapors), water vapor and other gases. In embodiments, the method further comprises condensing the chemicals and water, for example using a condenser. In further embodiments, the method comprises separating the condensed chemicals (also called condensed reaction products) from the liquid water and remaining gaseous compounds for example using a separator as described above.

In embodiments, the method further comprises post-treating these remaining gaseous compounds, for example using a post-treatment reactor as described above.

Advantages

In various embodiments, the apparatus and method of the invention may have several advantages as described below.

First, they embody a simplified process for producing chemicals, including Fischer-Tropsch reaction products, from methane-containing gases, making use of a single vessel (a reactor) for two reaction steps:
the generation of synthesis gas through partial oxidation, which occurs at a high reaction rate over a metal catalyst in a partial oxidation reaction zone, and
the reaction of this synthesis gas to produce the desired chemicals—for example Fischer-Tropsch reaction products via a Fischer-Tropsch reaction—in a Fischer-Tropsch reaction zone comprising an appropriate catalyst.

Secondly, the control of these reactions temperature is relatively easy, the partial oxidation being controlled by varying the partial pressures of the gases introduced in the reactor and the temperature of the Fischer-Tropsch reaction zone being controlled by cooling coils.

The exhaust gas or unreacted output gas is a fuel quality gas and can be used as feedstock for different process gas. In additions, it can be simply used to power the generators and compressors.

As needed, a water sparger can also be used to control the temperature of the Fischer-Tropsch reaction zone. It has the added advantage to increase the overall methane conversion and selectivity to CO in the partial oxidation reaction.

The energetic efficacy of the whole method and apparatus may be, if used, improved by a turbine that generates electricity from steam generated by different sub-elements (cooling coils, water heat boiler, condenser). In fact, the energy produced can be transformed to electricity, heat, steam as may be required at the location of use.

Filters in the reactor eliminate the need for using cyclones.

As discussed above, the filters, and catalysts are all easily cleaned, repaired, regenerated, or replaced through the provision of portholes and a blow back line. In particular, the removable disk gauze reactor reduces downtime when the metal catalyst of the gauze reactor deactivates.

Also, the produced chemicals can be fed directly into the pipeline from which the methane-containing gas was drawn, eliminating the need for storage vessels. This is particularly useful when the apparatus and method of the invention are used with natural gas associated with liquid hydrocarbons drawn from a well.

The apparatus is modular in nature and allows for numerous recycling points for water, gases, syngas, etc. The various part of the apparatus can therefore be sized to address uniqueness of the methane feed fuel and the environment from which it is extracted. The apparatus design can be easily adjusted to meet the needs of the location.

The apparatus and method can operate in currently uneconomical scenarios. The apparatus can be a standalone unit or can integrated into existing site-specific infrastructures.

The apparatus can also be configured to produce the desired hydrocarbon chain by adjusting pressure/volume/temperature and the catalyst Other advantages over conventional processes may include:
1) fewer steps,
2) fewer reaction vessels, e.g.:
   a. no water gas shift (WGS) reactor.
   b. no second step polishing reactor (to remove higher hydrocarbons before synthesis gas),
   c. no need to combust methane to maintain temperature of the synthesis reactor at around 900° C. (because partial oxidation is an exothermic reaction), and
   d. no methane start-up burner,
3) lower capital costs because:
   a. fewer reaction vessels are needed, and
   b. less catalyst for the CO step is used,
4) lower operating costs,
5) higher methane utility,
6) higher yields,
7) lower pressure drop,
8) mobile equipment due to small scale,
9) easy catalyst replacement or regeneration, and
10) lower resistance to diffusion through the particles (in a fluidized bed reactor compared to a fixed bed reactor).

DEFINITIONS

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

| List of parts | |
|---|---|
| (10) | pipeline |
| (12) | separator |
| (14) | gas cleaning unit |
| (16) | gas compressor |
| (18) | air line |
| (20) | air compressor |
| (22) | compressed air and gas line |
| (24) | fluidized bed reactor |
| (26) | gauze reactor |
| (28) | fluidized bed of Fischer-Tropsch catalyst |
| (29) | freeboard |
| (30) | induction heater |
| (32) | cooling coils |
| (34) | water sparger |
| (36a, 36b) | filters |
| (38a, 38b) | lines connecting filters (36a, 36b) to condenser (42) |
| (40a, 40b) | valves on line (38a, 38b) |
| (42) | condenser |
| (44, 44a, 44b) | blow back line and its branches |
| (46) | multi-way valve on line 44 |
| (48) | separator |
| (50) | Fischer-Tropsch reaction products line |
| (52) | post-treatment reactor |
| (54) | line feeding post-treatment reactor (52) |
| (56) | line feeding waste heat boiler (58) |
| (58) | waste heat boiler |
| (60) | expander |
| (62) | gas release line |
| (64) | water line feeding water sparger (34) |
| (66) | water line feeding water spargers (not shown) in post-treatment reactor (52) |
| (68) | water cooler |
| (70) | water line feeding waste heat boiler (44) |
| (72) | water line feeding cooling coils (32) |
| (74) | water line feeding condenser (38) |
| (76) | water vapor line from condenser (38) |
| (78) | turbine |
| (80) | water vapor line from cooling coils (32) |
| (82) | water vapor line from waste heat boiler (58) |
| (84) | line feeding water cooler (54) |
| (86) | shaft |

All these parts are individually well known and often commercially available.

FIG. 1 is a scheme of an apparatus according to an embodiment of the invention.

A methane-containing gas is provided through a pipeline (10). When the gas is provided as a blend with liquid hydrocarbons, a separator (12) is provided to separate the liquid hydrocarbons from the gas. The liquid hydrocarbons are returned to pipeline (10). When the gas comprises impurities that could poison the catalysts used, such as non-organic sulfur containing compounds, a gas cleaning unit (14) is provided to remove these compounds. When necessary, the methane-containing gas is then sent to a compressor (16) for compression to the operating pressure, which would typically be from about 1 to about 100 bars, preferably from about 5 to about 50 bars, more preferably from about 10 to about 30, and yet more preferably from about 15 to about 25, for example 20 bars.

Air is provided through a line (18) to a compressor (20) for compression to the operating pressure (same as above).

These reaction gases (i.e. both compressed air and compressed methane-containing gas) are then fed together through line (22) to the bottom of a fluidized bed reactor (24), where they pass through a gauze reactor (26) into a fluidized bed of a Fischer-Tropsch catalyst (28). An exothermic catalytic partial oxidation of the reaction gases occurs at gauze reactor (26) producing synthesis gas. An exothermic Fischer-Tropsch reaction of the synthesis gas occurs in fluidized bed (28) producing the desired hydrocarbons. After passing through fluidized bed (28), the gas pass into the freeboard (29), which is the zone of fluidized bed reactor (24) located above the fluidized bed.

Catalytic partial oxidation of the reaction gases occurs at a temperature of about 900-1000° C. When first starting the apparatus, the reaction gases are heated to this temperature by an induction heater (30) located below the gauze reactor (26). When the exothermic catalytic partial oxidation is ongoing, the temperature at gauze reactor (26) will, in many cases, be self-sustaining so induction heater (30) can be turned off. The temperature at gauze reactor (26) is controlled by varying the partial pressures of the reaction gases.

Fischer-Tropsch reaction occurs at a temperature of about 200-400° C. Fluidized bed (28) is thus cooled by cooling coils (32). Such cooling coil is generally sufficient to maintain a constant reaction temperature in the fluidized bed. However, if necessary, a water sparger (34), located above the gauze reactor (26) and at the bottom of the fluidized bed (28), can also be used to help control the temperature as well as the reaction kinetics in fluidized bed (28).

The reaction products of the Fischer-Tropsch reaction are then collected by filters (36a, 36b) in freeboard (29). These filters prevent the Fischer-Tropsch catalyst from escaping fluidized bed reactor (24).

The filters (36a, 36b) are each connected to a line (38a, 38b), these lines each being equipped with a valve (40a, 40b) and connecting the filters to a condenser (42). The reaction products are fed through these lines (38a, 38b) to condenser (42) that will condense the hydrocarbons and water.

When any one of the filters (36a, 36b) begins to plug, compressed air from air compressor (20) can be fed to the plugged filter through line (44) (blow back line). Line (44) is equipped with a multi-way valve (46) that separates it into branches (44a, 44b), each branch connecting to one of lines (38a, 38b) between the filter (36) and valve (40a, 40b). Therefore, when the pressure drop increases, the user should blow back the filters (36a, 36b) (closing valves (40a, 40b) to isolate the filters from the remainder of the apparatus). The blow back sequence should ideally be timed to minimize production disruptions.

From the condenser, the reaction products are fed to a separator (48) for separation of the gases, liquid water, and liquid Fischer-Tropsch reaction products. The Fischer-Tropsch reaction products are then returned to pipeline (10) through line (50).

The (hot and pressurized) gases are fed to a post-treatment reactor (52) through line (54). The hot and pressurized gases produced by this unit can then be fed, through line (56) to a waste heat boiler (58) that will use their thermic energy to heat water. The cooled, but still pressurized gases can then be used to drive an expander (60) to produce energy. Finally, the cooled depressurized gases (nitrogen, carbon dioxide and water vapor) can be released through line (62).

The liquid water separated from the Fischer-Tropsch reaction products in separator (48) can be used to feed water sparger (34) through line (50). This water can also be sent through line (66) to feed one or more spargers (not shown) in post-treatment reactor (58) to control temperature rise.

A water cooler (68) feeds water to waste heat boiler (58) through line (70), to cooling coils (32) through line (72), and to condenser (42) through line (74).

The pressurized water vapor exiting condenser (42) is sent through line (76) to a turbine (78) to produce energy. The pressurized water vapor exiting cooling coils (32) is sent through line (80) to turbine (78). The pressurized water vapor exiting waste heat boiler (58) is sent through line (82) to turbine (78). The water vapor exiting turbine (78) is then sent through line (84) to water cooler (68). Turbine (78) and/or expander (60) can drive a shaft (86) to power compressors (16) and/or (20).

Example 1

A capillary fluidized bed reactor with a diameter of 0.7 cm was used. The gas velocity ($\mu$) was 4 cm/s. The gas pressure (P) was 14.7 psi. The percentage of oxygen in the compressed air was 21%. 1.016 g of Pd were used as a partial oxidation catalyst.

Partial Oxidation Results

TABLE 1

| Exp. # | Temp. (° C.) | $O_2/CH_4$ | CO (%) | $O_2$ (%) | $CO_2$ (%) | $H_2$ (%) | $CH_4$ Conversion | Yield CO (%) | Yield $H_2$ (%) | $H_2/CO$ |
|---|---|---|---|---|---|---|---|---|---|---|
| 1 | 400 | 0.5 | 2.19 | 0.04 | 10.74 | 6.10 | 38.02 | 7.31 | 20.33 | 2.78 |
| 2 | 450 | 0.5 | 2.80 | 0.04 | 10.91 | 8.90 | 45.85 | 9.32 | 29.66 | 3.18 |
| 3 | 500 | 0.5 | 4.10 | 0.03 | 10.52 | 13.00 | 57.82 | 13.65 | 43.33 | 3.17 |
| 4 | 550 | 0.5 | 6.25 | 0.03 | 9.00 | 18.60 | 71.32 | 20.82 | 62.00 | 2.98 |
| 5 | 600 | 0.5 | 8.15 | 0.02 | 7.39 | 22.61 | 82.97 | 27.16 | 75.37 | 2.78 |
| 6 | 650 | 0.5 | 9.59 | 0.02 | 5.85 | 26.90 | 91.36 | 31.95 | 89.68 | 2.81 |
| 7 | 700 | 0.5 | 10.58 | 0.03 | 4.70 | 30.83 | 96.22 | 35.28 | 99+ | 2.91 |
| 8 | 750 | 0.5 | 10.76 | 0.02 | 4.08 | 31.97 | 98.74 | 35.87 | 99+ | 2.97 |
| 9 | 800 | 0.5 | 10.88 | 0.02 | 3.71 | 32.70 | 99.54 | 36.26 | 99+ | 3.01 |

Fischer-Tropsch Results

TABLE 2

| Exp. # | Temperature (°C.) | P (psi) | $H_2/CO$ | Flow, (l/min) | u (cm/s) | CO conversion |
|---|---|---|---|---|---|---|
| 1 | 220 | 130 | 2.1 | 1.4 | 1.5 | 67% |
| 2 | 220 | 130 | 2.8 | 2.8 | 2.9 | 49% |
| 3 | 220 | 180 | 2.1 | 2.8 | 2.9 | 15% |
| 4 | 220 | 180 | 2.8 | 1.4 | 1.5 | 70% |
| 5 | 280 | 130 | 2.1 | 2.8 | 2.9 | 43% |
| 6 | 280 | 130 | 2.8 | 1.4 | 1.5 | 33% |
| 7 | 280 | 180 | 2.1 | 1.4 | 1.5 | 63% |
| 8 | 280 | 180 | 2.8 | 2.8 | 2.9 | 71% |

Example 2

Partial Oxidation

Partial oxidation reactions were performed using a fluidized bed, a fixed bed and a gauze reactor. N.B. In the tables below, Q is the flow rate of the gas exiting the reactor.

Fluidized Bed

For these tests, the catalyst was a commercial powder 1% Pt catalyst over $Al_2O_3$ (Sigma Aldrich), 325 mesh. About 1.0 g of catalyst was used for each test.

TABLE 3

| Exp. # | T (°C.) | P (atm) | $O_2/CH_4$ | Q, exit (mol/min) | CO (%) | $O_2$ (%) | $CO_2$ (%) | $H_2$ (%) |
|---|---|---|---|---|---|---|---|---|
| 1 | 850 | 1 | 0.45 | 0.002 | 15.39% | 0.48% | 1.06% | 39.60% |
| 2 | 850 | 1 | 0.5 | 0.002 | 15.27% | 0.66% | 1.22% | 35.67% |
| 3 | 850 | 1 | 0.55 | 0.002 | 16.15% | 0.76% | 1.19% | 36.56% |
| 2-R | 850 | 1 | 0.5 | 0.002 | 15.48% | 0.57% | 1.05% | 38.68% |
| 4 | 900 | 1 | 0.45 | 0.002 | 17.09% | 0.54% | 0.73% | 42.04% |
| 5 | 900 | 1 | 0.5 | 0.002 | 17.45% | 0.95% | 1.20% | 42.48% |
| 5-R | 900 | 1 | 0.5 | 0.002 | 17.67% | 1.05% | 1.17% | 41.97% |
| 6 | 900 | 1 | 0.55 | 0.002 | 18.07% | 0.92% | 1.26% | 42.87% |
| 7 | 950 | 1 | 0.45 | 0.003 | 18.01% | 0.86% | 1.06% | 43.57% |
| 8 | 950 | 1 | 0.5 | 0.003 | 18.34% | 0.98% | 1.31% | 43.49% |
| 8-R | 950 | 1 | 0.5 | 0.003 | 18.23% | 0.81% | 1.12% | 43.53% |
| 9 | 950 | 1 | 0.55 | 0.003 | 18.23% | 0.96% | 1.33% | 43.04% |

| Exp. # | T (°C.) | P (atm) | $O_2/CH_4$ | Q, exit (mol/min) | $CH_4$ Conversion | Yield CO (%) | Yield $H_2$ (%) | $H_2/CO$ |
|---|---|---|---|---|---|---|---|---|
| 1 | 850 | 1 | 0.45 | 0.002 | 76.46% | 53.30% | 45.14% | 1.69 |
| 2 | 850 | 1 | 0.5 | 0.002 | 72.43% | 49.55% | 39.30% | 1.59 |
| 3 | 850 | 1 | 0.55 | 0.002 | 80.31% | 62.31% | 53.97% | 1.73 |
| 2-R | 850 | 1 | 0.5 | 0.002 | 75.22% | 54.15% | 44.66% | 1.65 |
| 4 | 900 | 1 | 0.45 | 0.002 | 81.53% | 63.57% | 55.19% | 1.74 |
| 5 | 900 | 1 | 0.5 | 0.002 | 88.79% | 74.94% | 71.38% | 1.91 |
| 5-R | 900 | 1 | 0.5 | 0.002 | 88.23% | 74.46% | 69.94% | 1.88 |
| 6 | 900 | 1 | 0.55 | 0.002 | 96.24% | 87.63% | 88.54% | 2.02 |
| 7 | 950 | 1 | 0.45 | 0.003 | 86.04% | 72.19% | 66.15% | 1.83 |
| 8 | 950 | 1 | 0.5 | 0.003 | 91.56% | 80.31% | 78.28% | 1.95 |
| 8-R | 950 | 1 | 0.5 | 0.003 | 90.71% | 79.54% | 76.25% | 1.92 |
| 9 | 950 | 1 | 0.55 | 0.003 | 94.57% | 85.38% | 85.27% | 2.00 |

Fixed Bed

For these tests the catalyst was a commercial powder 1% Pt catalyst over $Al_2O_3$ (Sigma Aldrich), 325 mesh mixed with $Al_2O_3$. About 0.65 g of catalyst+0.65 g of $Al_2O_3$ were used (diluting the bed helped avoiding hot spots), which made the content of Pt equal to 0.5% by weight.

TABLE 4

| Exp. # | T (°C.) | P (atm) | Q, exit (mol/min) | $O_2/CH_4$ | CO (%) | $O_2$ (%) | $CO_2$ (%) | $H_2$ (%) |
|---|---|---|---|---|---|---|---|---|
| 7 | 850 | 20 | 0.036 | 0.45 | 20.05% | 0.29% | 26.58% | 10.31% |
| 8 | 850 | 20 | 0.037 | 0.5 | 26.39% | 0.34% | 28.99% | 24.00% |
| 9 | 850 | 20 | 0.037 | 0.55 | 29.01% | 0.34% | 30.80% | 22.69% |

| Exp. # | T (°C.) | P (atm) | Q, exit (mol/min) | $O_2/CH_4$ | $CH_4$ Conversion | Yield CO (%) | Yield $H_2$ (%) | $H_2/CO$ |
|---|---|---|---|---|---|---|---|---|
| 7 | 850 | 20 | 0.036 | 0.45 | 18.36% | 51.39% | 16.35% | 0.64 |
| 8 | 850 | 20 | 0.037 | 0.5 | 39.78% | 90.94% | 18.45% | 0.41 |
| 9 | 850 | 20 | 0.037 | 0.55 | 31.95% | 78.23% | 18.94% | 0.48 |

Gauze Reactor (Fecralloy®)

The catalyst used in these tests was manufactured by stacking several coated 100S Fecralloy® discs to make a 3-cm high cylinder. The coating was ~7% $Al_2O_3$ and ~1% Pt.

To make the catalytic fiber, the Fecralloy® fiber was first treated in a muffle at 1000° C. for 3 hours (3° C./min was the ramp used for both the heating and cooling steps). Then, a 0.44M $Al_2(NO_3)_3.9H_2O$ solution was atomized onto both sides of the pre-treated Fecralloy® fiber on a hot plate kept at 300° C. The coated Fecralloy® fiber was calcined in a muffle at 300° C. for 3 hours (3° C./min was the ramp used for both the heating and cooling steps). Then, the coated Fecralloy® fiber was contacted with a solution 0.02 M of $H_2PtCl_6.6H_2O$ for 24 hours. The coated Fecralloy® fiber was then dried and calcined at 1000° C. for 3 hours (3° C./min was the ramp used for both the heating and cooling steps).

TABLE 5

| Exp. # | T (° C.) | P (atm) | Q, exit (mol/min) | $O_2/CH_4$ | CO (%) | $O_2$ (%) | $CO_2$ (%) | $H_2$ (%) |
|---|---|---|---|---|---|---|---|---|
| 1 | 850 | 1 | 0.003 | 0.45 | 10.80% | 0.01% | 6.09% | 25.59% |
| 2 | 850 | 1 | 0.003 | 0.5 | 10.46% | −0.14% | 5.19% | 26.19% |
| 3 | 850 | 1 | 0.004 | 0.55 | 9.54% | −0.01% | 6.28% | 23.02% |
| 4 | 850 | 10 | 0.034 | 0.45 | 6.62% | 0.05% | 3.83% | 17.40% |
| 5 | 850 | 10 | 0.034 | 0.5 | 7.40% | −0.09% | 4.15% | 20.62% |
| 6 | 850 | 10 | 0.027 | 0.55 | 6.35% | 0.32% | 2.23% | 29.51% |
| 7 | 850 | 20 | 0.055 | 0.45 | 6.50% | 0.00% | 3.50% | 11.88% |
| 8 | 850 | 20 | 0.056 | 0.5 | 7.07% | 0.08% | 4.06% | 13.39% |
| 9 | 850 | 20 | 0.047 | 0.55 | 7.61% | 0.06% | 4.56% | 14.81% |
| 10 | 900 | 1 | 0.003 | 0.45 | 10.42% | 0.05% | 5.10% | 27.43% |
| 11 | 900 | 1 | 0.003 | 0.5 | 10.24% | 0.29% | 5.39% | 26.69% |
| 12 | 900 | 1 | 0.003 | 0.55 | 9.07% | 0.18% | 6.27% | 21.54% |
| 13 | 900 | 10 | 0.035 | 0.45 | 6.87% | 0.16% | 3.59% | 22.23% |
| 14 | 900 | 10 | 0.035 | 0.5 | 7.68% | 0.02% | 4.15% | 23.62% |
| 15 | 900 | 10 | 0.036 | 0.55 | 8.43% | 0.04% | 4.67% | 23.57% |
| 16 | 900 | 20 | 0.048 | 0.45 | 6.60% | 0.04% | 3.12% | 13.77% |
| 17 | 900 | 20 | 0.059 | 0.5 | 7.15% | 0.05% | 3.78% | 15.35% |
| 18 | 900 | 20 | 0.050 | 0.55 | 7.33% | 0.06% | 4.38% | 14.64% |
| 19 | 950 | 1 | 0.005 | 0.45 | 11.48% | 0.09% | 7.19% | 25.06% |
| 20 | 950 | 1 | 0.004 | 0.5 | 10.81% | 0.07% | 6.63% | 26.76% |
| 21 | 950 | 1 | 0.004 | 0.55 | 10.40% | −0.04% | 6.58% | 26.07% |
| 22 | 950 | 10 | 0.039 | 0.45 | 7.29% | 0.23% | 2.82% | 28.93% |
| 23 | 950 | 10 | 0.050 | 0.5 | 9.45% | 0.04% | 1.99% | 30.99% |
| 24 | 950 | 10 | 0.047 | 0.55 | 10.60% | −0.05% | 2.80% | 33.85% |
| 25 | 950 | 20 | 0.046 | 0.45 | 5.94% | 0.04% | 3.34% | 13.88% |
| 26 | 950 | 20 | 0.048 | 0.5 | 7.74% | 0.00% | 2.95% | 19.43% |
| 27 | 950 | 20 | 0.046 | 0.55 | 8.42% | 0.02% | 3.24% | 19.06% |

| Exp. # | T (° C.) | P (atm) | Q, exit (mol/min) | $O_2/CH_4$ | $CH_4$ Conversion | Yield CO (%) | Yield H (%) | $H_2/CO$ |
|---|---|---|---|---|---|---|---|---|
| 1 | 850 | 1 | 0.003 | 0.45 | 60.59% | 34.83% | 41.27% | 2.37 |
| 2 | 850 | 1 | 0.003 | 0.5 | 58.42% | 34.86% | 43.65% | 2.50 |
| 3 | 850 | 1 | 0.004 | 0.55 | 62.90% | 26.71% | 32.22% | 2.41 |
| 4 | 850 | 10 | 0.034 | 0.45 | 45.18% | 17.13% | 22.51% | 2.63 |
| 5 | 850 | 10 | 0.034 | 0.5 | 51.04% | 19.53% | 27.24% | 2.79 |
| 6 | 850 | 10 | 0.027 | 0.55 | 38.44% | 17.53% | 40.81% | 4.66 |
| 7 | 850 | 20 | 0.055 | 0.45 | 35.19% | 21.23% | 19.40% | 1.83 |
| 8 | 850 | 20 | 0.056 | 0.5 | 38.98% | 23.87% | 22.61% | 1.89 |
| 9 | 850 | 20 | 0.047 | 0.55 | 34.41% | 31.11% | 30.28% | 1.95 |
| 10 | 900 | 1 | 0.003 | 0.45 | 60.20% | 33.62% | 44.22% | 2.63 |
| 11 | 900 | 1 | 0.003 | 0.5 | 59.04% | 34.12% | 44.49% | 2.61 |
| 12 | 900 | 1 | 0.003 | 0.55 | 50.69% | 31.60% | 37.50% | 2.37 |
| 13 | 900 | 10 | 0.035 | 0.45 | 50.60% | 17.60% | 28.47% | 3.23 |
| 14 | 900 | 10 | 0.035 | 0.5 | 54.43% | 20.30% | 31.23% | 3.08 |
| 15 | 900 | 10 | 0.036 | 0.55 | 55.52% | 23.89% | 33.40% | 2.80 |
| 16 | 900 | 20 | 0.048 | 0.45 | 37.16% | 21.57% | 22.49% | 2.09 |
| 17 | 900 | 20 | 0.059 | 0.5 | 41.14% | 24.17% | 25.92% | 2.14 |
| 18 | 900 | 20 | 0.050 | 0.55 | 40.83% | 25.93% | 25.89% | 2.00 |
| 19 | 950 | 1 | 0.005 | 0.45 | 71.15% | 28.35% | 30.93% | 2.18 |
| 20 | 950 | 1 | 0.004 | 0.5 | 69.18% | 31.28% | 38.73% | 2.48 |
| 21 | 950 | 1 | 0.004 | 0.55 | 69.40% | 30.10% | 37.73% | 2.51 |
| 22 | 950 | 10 | 0.039 | 0.45 | 54.10% | 21.54% | 42.73% | 3.97 |
| 23 | 950 | 10 | 0.050 | 0.5 | 68.78% | 24.41% | 40.02% | 3.28 |
| 24 | 950 | 10 | 0.047 | 0.55 | 69.51% | 29.37% | 46.99% | 3.20 |
| 25 | 950 | 20 | 0.046 | 0.45 | 33.55% | 19.43% | 22.70% | 2.34 |
| 26 | 950 | 20 | 0.048 | 0.5 | 46.08% | 26.13% | 32.79% | 2.51 |
| 27 | 950 | 20 | 0.046 | 0.55 | 49.59% | 28.99% | 32.80% | 2.26 |

Example 3

Fischer-Tropsch

Fischer-Tropsch reaction was performed using a fluidized bed and a fixed bed. N.B. In the tables below, Q is the flow rate of the gas exiting the reactor.

Fluidized Bed

The catalyst used in this experiment is Fe/K/Cu with $Al_2O_3$ as support. About 12 g of catalyst was used in a 1.27 cm ID reactor

TABLE 6

Gas phase

| Exp. # | T (° C.) | P (atm) | $H_2$/CO | Q, exit (mol/min) | CO (%) | $H_2$ (%) | $CO_2$ (%) | $CH_4$ (%) | $C_2$-$C_4$ (%) |
|---|---|---|---|---|---|---|---|---|---|
| 1 | 240 | 20 | 2 | 0.07 | 12 | 14 | 6 | 12 | 0.01 |

TABLE 7

Liquid phase

| Exp. # | T (° C.) | P (atm) | $H_2$/CO | Liquid trapped ml | Weight oil in trap g | $C_7$-$C_{20}$ (%) | $C_{21+}$ (%) |
|---|---|---|---|---|---|---|---|
| 1 | 240 | 20 | 2 | 46.00 | 2.1 | 84% | 16% |

TABLE 8

| Exp. # | T (° C.) | P (atm) | $H_2$/CO | Q, exit (mol/min) | CO conversion | Yield $CO_2$ (%) | $CH_4$ (%) | $C_2$-$C_4$ (%) | $C_{5+}$ (%) |
|---|---|---|---|---|---|---|---|---|---|
| 1 | 240 | 20 | 2 | 0.07 | 39 | 24% | 8% | 6% | 0.9% |

Fixed Bed

The catalyst used in this experiment is the same as for the fixed bed. The reactor contained 5 g of catalyst diluted with 5 g of $Al_2O_3$ in order to avoid hot spots.

TABLE 9

Gas phase

| Exp. # | T (° C.) | P (atm) | $H_2$/CO | Q, exit (mol/min) | CO (%) | $H_2$ (%) | $CO_2$ (%) | $CH_4$ (%) | $C_2$-$C_4$ (%) |
|---|---|---|---|---|---|---|---|---|---|
| 2 | 240 | 20 | 2 | 0.01 | 15 | 12 | 3 | 24 | 0.01 |

TABLE 10

Liquid phase

| Exp. | T (° C.) | P (atm) | $H_2$/CO | Liquid trapped ml | Weight oil in trap g | $C_7$-$C_{20}$ (%) | $C_{21+}$ (%) |
|---|---|---|---|---|---|---|---|
| 2 | 240 | 20 | 2 | 60.00 | 3.2 | 81% | 19% |

TABLE 11

| Exp. # | T (° C.) | P (atm) | $H_2$/CO | Q, exit (mol/min) | CO conversion | Yield $CO_2$ (%) | $CH_4$ (%) | $C_2$-$C_4$ (%) | $C_{5+}$ (%) |
|---|---|---|---|---|---|---|---|---|---|
| 2 | 240 | 20 | 2 | 0.01 | 12 | 15.00% | 12% | 0.4% | 0.6% |

Example 4

Dual Stage Reactor

The experiment performed in dual stage reactor for 70 hours.

The first stage was a fixed bed of 4 g of Pt 1% supported on $Al_2O_3$ mixed 50% with $Al_2O_3$. The reactor worked at 900° C. and 20 atm. This is the partial oxidation (POX) reactor.

The second stage was a fixed bed of 10 g of Fe/Cu/K catalyst supported on $Al_2O_3$ diluted 50% with $Al_2O_3$. The average temperature in this second stage was about 240° C. This was the Fischer-Tropsch reactor.

The two stages were superposed and the exit stream of the POX reactor was the feed stream for the Fischer-Tropsch reactor. The system was fed (at the level of the POX reactor) by 150 ml/min with pure $CH_4$ and 223 ml/min mixture of 30% $O_2$ in Ar. The pressure was set at 20 atm with a back pressure valve at the exit of the Fischer Tropsch Reactor. The temperature was controlled for both reactors with electric heaters.

N.B. In the tables below, Q is the flow rate of the gas exiting the reactor.

TABLE 12

Gas phase

| Exp. # | P (atm) | Q, exit (mol/min) | CO (%) | $H_2$ (%) | $CO_2$ (%) | $CH_4$ (%) | $C_2$-$C_4$ (%) |
|---|---|---|---|---|---|---|---|
| 3 | 20 | 0.01 | 15% | 13% | 5% | 18 | <1% |

TABLE 13

Liquid phase

| Exp. # | P (atm) | Liquid trapped (ml) | Weight oil in trap (g) | $C_7$-$C_{20}$ (%) | $C_{21+}$ (%) |
|---|---|---|---|---|---|
| 3 | 20 | 90.00 | 0.5 | 23% | 77% |

TABLE 14

| Exp. # | T (° C.) | P (atm) | $H_2$/CO | Q, exit (mol/min) | $CH_4$ conversion | Yield CO (%) | $CO_2$ (%) | $C_7$-$C_{20}$ (%) | $C_{21+}$ (%) |
|---|---|---|---|---|---|---|---|---|---|
| 3 | 240 | 20 | 2 | 0.023 | 52 | 34 | 12 | 0.3% | 1% |

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

Bjørn Christian Enger, Rune Lødeng, Anders Holmen, A review of catalytic partial oxidation of methane to synthesis gas with emphasis on reaction mechanisms over transition metal catalysts, Applied Catalysis A: General 346 (2008) 1-27

The invention claimed is:

1. An apparatus for producing chemicals from a methane-containing gas, the apparatus comprising:
a reactor comprising:
   a gas input,
   a reaction product output, the gas input and the reaction product output defining together a gas flow path in the reactor,
   a partial oxidation reaction zone located inside the reactor downstream of the gas input, the partial oxidation reaction zone comprising a supported or unsupported partial oxidation metal catalyst, and
   a Fischer-Tropsch reaction zone located inside the reactor downstream of the partial oxidation reaction zone, the Fischer-Tropsch reaction zone comprising a Fischer-Tropsch catalyst,
a methane-containing gas source feeding the methane-containing gas at a given partial pressure to the gas input, and
an air source feeding air at a given partial pressure to the gas input,
wherein, upon starting operation, the partial oxidation reaction zone is heated to start a partial oxidation reaction, and wherein, during operation, the temperature in the partial oxidation reaction zone is controlled by variation of the partial pressure of the methane-containing gas fed to the input.

2. The apparatus of claim 1, wherein the partial oxidation reaction zone comprises a fluidized bed of the partial oxidation metal catalyst.

3. The apparatus of claim 1, wherein the partial oxidation reaction zone comprises a fixed bed of the partial oxidation metal catalyst.

4. The apparatus of claim 1, wherein the partial oxidation reaction zone comprises a gauze reactor containing the partial oxidation metal catalyst.

5. The apparatus of claim 1, wherein the Fischer-Tropsch reaction zone comprises a fluidized bed of the Fischer-Tropsch catalyst.

6. The apparatus of claim 1, wherein the Fischer-Tropsch reaction zone comprises a fixed bed of the Fischer-Tropsch catalyst.

7. The apparatus of claim 1, wherein, upon starting operation, the partial oxidation reaction zone is heated by burning methane in the partial oxidation reaction zone.

8. The apparatus of claim 1, wherein, upon starting operation, the partial oxidation reaction zone is heated by a heater located downstream of the gas input and upstream of the partial oxidation reaction zone.

9. The apparatus of claim 1, further comprising a cooling device to maintain the Fischer-Tropsch reaction zone at a temperature appropriate for reaction with the Fischer-Tropsch catalyst.

10. The apparatus of claim 9, wherein the cooling device is cooling coils located in the Fischer-Tropsch reaction zone.

11. The apparatus of claim 9, wherein the cooling device is a water sparger located downstream of the partial oxidation reaction zone and upstream of the Fischer-Tropsch reaction zone.

12. The apparatus of claim 1, wherein the temperature of the Fischer-Tropsch reaction zone is between about 180 to about 450° C.

13. The apparatus of claim 1, further comprising a condenser connected to the reaction product output of the reactor and comprising a condensed reaction product output.

14. The apparatus of claim 13, further comprising a separator, or two or more successive separators, connected to the condensed reaction product output of the condenser and comprising a gas output, a liquid water output, and a liquid reaction products output.

15. The apparatus of claim 1, wherein the partial oxidation metal catalyst is an unsupported or supported transition metal of the groups IIIB to VIIIB.

16. The apparatus of claim 1, wherein the Fischer-Tropsch catalyst is unsupported or supported Fe, Co, Ni, Pd, Pt, Rh, and Ru, in metal form or in oxide form.

17. A method for producing chemicals from a methane-containing gas in the apparatus of claim 1, the method comprising the steps of:
   (a) introducing a mixture of the methane-containing gas and air in the reactor comprising the partial oxidation reaction zone and the Fischer-Tropsch reaction zone,
   (b) allowing the mixture to pass through the partial oxidation reaction zone at a temperature of about 800 to 1200° C., the partial oxidation reaction zone comprising the supported or unsupported partial oxidation metal catalyst, thereby producing synthesis gas,
   (c) allowing the synthesis gas to pass through the Fischer-Tropsch reaction zone comprising the Fischer-Tropsch catalyst maintained at an appropriate temperature for Fischer-Tropsch reaction, thereby producing the chemicals, and
   (d) collecting the chemicals from the reaction product output of the reactor.

18. The method of claim 17, further comprising, before step (b), heating the partial oxidation reaction zone by burning methane in the partial oxidation reaction zone.

19. The method of claim 17, further comprising, during step (b) maintaining the temperature in the partial oxidation reaction zone at about 800 to 1200° C. by varying a partial pressure of the methane-containing gas introduced in the reactor.

20. The method of claim 17, further comprising condensing the chemicals and separating the condensed chemicals from water and remaining gaseous compounds.

* * * * *